United States Patent
Yasuda

(10) Patent No.: US 8,261,113 B2
(45) Date of Patent: Sep. 4, 2012

(54) DATA PROCESSING APPARATUS COMMUNICATING WITH A COMPUTER TERMINAL OVER A NETWORK

(75) Inventor: Masataka Yasuda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 585 days.

(21) Appl. No.: 12/339,690

(22) Filed: Dec. 19, 2008

(65) Prior Publication Data

US 2009/0164816 A1 Jun. 25, 2009

(30) Foreign Application Priority Data

Dec. 20, 2007 (JP) ................................. 2007-328732

(51) Int. Cl.
G06F 1/26 (2006.01)
G06F 1/32 (2006.01)
(52) U.S. Cl. ...................................................... 713/320
(58) Field of Classification Search .................... 713/320
See application file for complete search history.

(56) References Cited

U.S. PATENT DOCUMENTS

| 7,389,431 | B2 | 6/2008 | Ohara |
| 2006/0010331 | A1 | 1/2006 | Ohara |
| 2009/0046711 | A1* | 2/2009 | Poikela .................. 370/389 |

FOREIGN PATENT DOCUMENTS

JP 2006-25212 A 1/2006

* cited by examiner

Primary Examiner — Mohammed Rehman
(74) Attorney, Agent, or Firm — Canon USA Inc. IP Division

(57) ABSTRACT

When a packet received in a deep sleep mode matches a packet stored in a WOL-pattern storage region, a network portion performs reply processing suited for the matched packet after returning a power supply mode of a power supply unit from the deep sleep mode to a normal mode. When the packet received in the deep sleep mode matches a packet stored in a proxy-response-pattern storage region, the network portion performs reply processing suited for the matched packet while maintaining the power supply mode of the power supply unit at the deep sleep mode.

9 Claims, 11 Drawing Sheets

FIG. 6

| Destination Ether Address | 000085000001 |
|---|---|
| Source Ether Address | 000085000002 |
| Destination IP Address | 192.168.10.1 |
| Source IP Address | 192.168.11.1 |
| Data Type | 10 (Status Request) |
| Status Type 1 | 30001 (Amount of Toner Remaining) |
| Status Type 2 | 30002 (Amount of Paper Left in First Cassette) |

FIG. 7

| Destination Ether Address | 000085000001 |
|---|---|
| Source Ether Address | 000085000002 |
| Destination IP Address | 192.168.10.1 |
| Source IP Address | 192.168.11.1 |
| Data Type | 10 (Status Request) |
| Status Type 1 | 30003 (Amount of Paper Left in Second Cassette) |
| Status Type 2 | 30004 (Amount of Paper Left in Third Cassette) |

FIG. 8

| Description of Packet Pattern | Packet Pattern |
|---|---|
| Status Request/Amount of Paper Left in Second Cassette | 10-30003 |
| Status Request/Amount of Paper Left in Third Cassette | 10-30004 |

FIG. 9

| Description of Packet Pattern | Packet Pattern |
|---|---|
| Status Request/Amount of Toner Remaining | 10-30001 |
| Status Request/Amount of Paper Left in First Cassette | 10-30002 |

FIG. 10

| | |
|---|---|
| Destination Ether Address | 000085000002 |
| Source Ether Address | 000085000001 |
| Destination IP Address | 192.168.11.1 |
| Source IP Address | 192.168.10.1 |
| Data Type | 11 (Status Response) |
| Status Type 1 | 40003 (Paper is Present in Second Cassette) |
| Status Type 2 | 40005 (No Paper in Third Cassette) |

FIG. 11

| Description of Packet Pattern | Proxy Response Data |
|---|---|
| Status Request/Amount of Toner Remaining | 40001 (Low Toner Level) |
| Status Request/Amount of Paper Left in First Cassette | 40002 (Paper is Present in First Cassette) |

FIG. 12

| Destination Ether Address | 000085000002 |
|---|---|
| Source Ether Address | 000085000001 |
| Destination IP Address | 192.168.11.1 |
| Source IP Address | 192.168.10.1 |
| Data Type | 11 (Status Response) |
| Status Type 1 | 40001 (Low Toner Level) |
| Status Type 2 | 40002 (Paper is Present in First Cassette) |

| Description of Packet Pattern | Packet Pattern | Number of Receptions for Switching to Proxy Response Pattern |
|---|---|---|
| Status Request/Amount of Paper Left in Second Cassette | 10-30003 | 20 |
| Status Request/Amount of Paper Left in Third Cassette | 10-30004 | 30 |

DATA PROCESSING APPARATUS COMMUNICATING WITH A COMPUTER TERMINAL OVER A NETWORK

BACKGROUND OF THE INVENTION

1. Field of the Invention

The present invention relates to a data processing apparatus and data processing method, more specifically, reducing power consumption and an enhancing processing speed by use of a proper operation.

2. Description of the Related Art

In the field of data processing apparatuses, such as printers or copiers, there is a growing need to reduce power consumption in a state where the apparatus does not operate (inactive state). One known approach to the need is a technique for reducing power consumption in an inactive state by decreasing (or interrupting) supplying a power to a main controller controlling a data processing apparatus in the inactive state of the data processing apparatus.

The function of connecting to a network is being embedded in data processing apparatuses as a standard feature. A data processing apparatus capable of connecting to a network can perform various kinds of data processing by receiving data and a command from an information processing apparatus, such as a personal computer, over the network and processing the data and command.

When a technique for reducing power consumption is applied to a data processing apparatus having the function of connecting to a network, a problem arises in which it is difficult for the data processing apparatus to quickly perform processing for data and a command received over the network in its inactive state. For example, a case is discussed where a power supplied to a main controller of the data processing apparatus is made smaller than that in a normal state (or interrupted) in an inactive state of the data processing apparatus. In this case, when the data or command is received over the network in the inactive state, the main controller is not operating. Because of this, the data or command remains unprocessed until the inactive state becomes active in response to restarting of supplying the power to the main controller.

When a technique for reducing power consumption is applied to a data processing apparatus having the function of connecting to a network, another problem arises. That is, if the data processing apparatus frequently receives data or commands, the data processing apparatus returns from an inactive state to an active state, and thus the advantageous effects of reducing power consumption are undesirably small.

There is a known technique of interrupting supplying a power to a main controller in an inactive state of a data processing apparatus while continuing supplying a power to a sub controller to process data or a command received by the sub controller over a network (see, for example, Japanese Patent Laid-Open No. 2006-025212). The technique disclosed in this patent document can achieve both a reduction in power consumption by interrupting supplying a power to a main controller of a data processing apparatus and an enhancement in processing speed for data or a command received over a network by a sub controller performing the processing.

For the technique disclosed in the above-mentioned Japanese Patent Laid-Open No. 2006-025212, a packet pattern that requires the data processing apparatus to return from an inactive state to an active state is stored in advance in a region to which the sub controller can refer, and the sub controller causes the data processing apparatus to return from the inactive state to the active state when a packet pattern received over the network matches the previously stored packet pattern.

However, with the technique disclosed in the above-mentioned Japanese Patent Laid-Open No. 2006-025212, a packet pattern is stored in advance in a region to which the sub controller can refer, so a new packet pattern cannot be registered. Even if registering a new packet pattern is made possible, the number of packet patterns that can be registered depends on the amount of a storage area. Further, even if a new packet pattern can be registered in advance, it is difficult to determine in advance which packet pattern is to be registered in a region to which the sub controller can refer. This is because it is difficult for a user of the data processing apparatus to know in advance what kind of packet pattern is frequently used in accordance with a network environment where the data processing apparatus is placed.

SUMMARY OF THE INVENTION

An embodiment of the present invention provides an improved data processing apparatus and data processing method.

An aspect of the present invention can provide a data processing apparatus capable of communicating with a computer terminal over a network. The data processing apparatus includes a packet processing unit configured to receive a packet transmitted from the computer terminal and perform reply processing to the packet, a control unit configured to control the data processing apparatus, a power supplying unit configured to supply power in either one of a normal mode in which the power supplying unit supplies power to both the control unit and the packet processing unit and a power-saving mode in which the power supplying unit supplies power to the packet processing unit while supplying less power than the power supplied in the normal mode to the control unit, and a storage unit configured to store a packet in a storage region to which the packet processing unit is capable of accessing in the power-saving mode. The packet processing unit is configured to, when a type of a packet received by the packet processing unit in the power-saving mode matches a type of a first packet stored in the storage region, perform reply processing suited for the matched packet after returning a power supply mode in which the power supplying unit operates from the power-saving mode to the normal mode and to, when a type of the packet received by the packet processing unit in the power-saving mode matches a packet stored in the storage region, perform reply processing suited for the matched packet while maintaining the power supply mode in which the power supplying unit operates at the power-saving mode. The storage unit is configured to change a type of a specific packet stored in the storage region from the type of the first packet to the type of the second packet, in response to a specific status of a reception state in which the specific packet is received by the packet processing unit.

Different embodiments of the present invention can be made without departing from the spirit and scope thereof, it is to be understood that the invention is not limited to the specific embodiments thereof except as defined in the appended claims.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate numerous embodiments, features and aspects of the invention and, together with the description, serve to explain the principles of the invention.

FIG. 6 illustrates one example of a packet received by the network portion from a personal computer (PC) over a local area network (LAN).

FIG. 7 illustrates one example of a packet received by the network portion from the PC over the LAN.

FIG. 8 illustrates examples of packet patterns stored in a WOL-pattern storage region.

FIG. 9 illustrates examples of packet patterns stored in a proxy-response-pattern storage region.

FIG. 10 illustrates one example of a response pattern.

FIG. 11 illustrates one example of proxy response data.

FIG. 12 illustrates one example of a response pattern.

DESCRIPTION OF THE EMBODIMENTS

Figure 1:
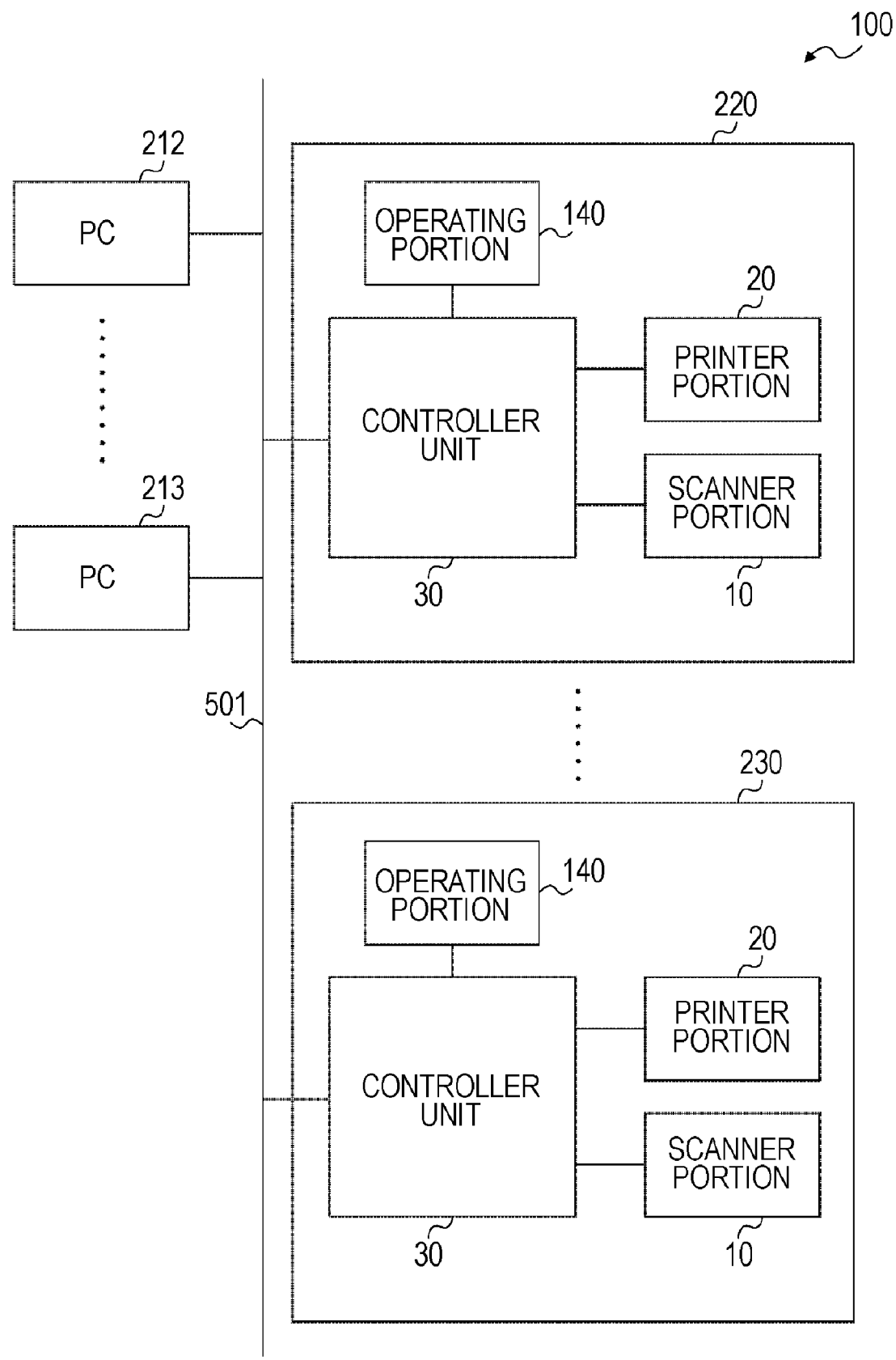
FIG. 1 is a block diagram of a printing system.

The present invention will now be described in detail with reference to the drawings showing a various embodiment thereof. In the drawings, elements and parts which are identical throughout the views are designated by identical reference numerals, and duplicate description thereof is omitted.

FIG. 1 is a block diagram that illustrates a configuration of a printing system including a data processing apparatus according to a first embodiment of the present invention.

Referring to FIG. 1, a printing system 100 includes image forming apparatuses 220 and 230 having the function of outputting an image and personal computers (PCs) 212 and 213 each serving as a computer terminal. These are connected over a local area network (LAN) 501 so as to be able to communicate with each other.

The image forming apparatuses 220 and 230 (data processing apparatuses) have substantially the same configuration. The PCs 212 and 213 have substantially the same configuration. Thus, the image forming apparatus 220 and the PC 212 are described below.

The image forming apparatus 220 includes an operating portion 140 through which a user of the image forming apparatus 220 can perform various operations, a scanner portion 10 configured to read image information in response to an instruction from the operating portion 140, and a printer portion 20 configured to print image data on a sheet. The image forming apparatus 220 further includes a controller unit 30 configured to control the scanner portion 10 and the printer portion 20 on the basis of an instruction from the operating portion 140 and the PC 212.

The PC 212 transmits a print job including image data of one or more pages to the image forming apparatus 220 over the LAN 501. The PC 212 transmits to the image forming apparatus 220 various commands in addition to the print job.

The image forming apparatus 220 receives a print job from the PC 212 over the LAN 501 and prints the image data included in the print job on a sheet.

Figure 2:
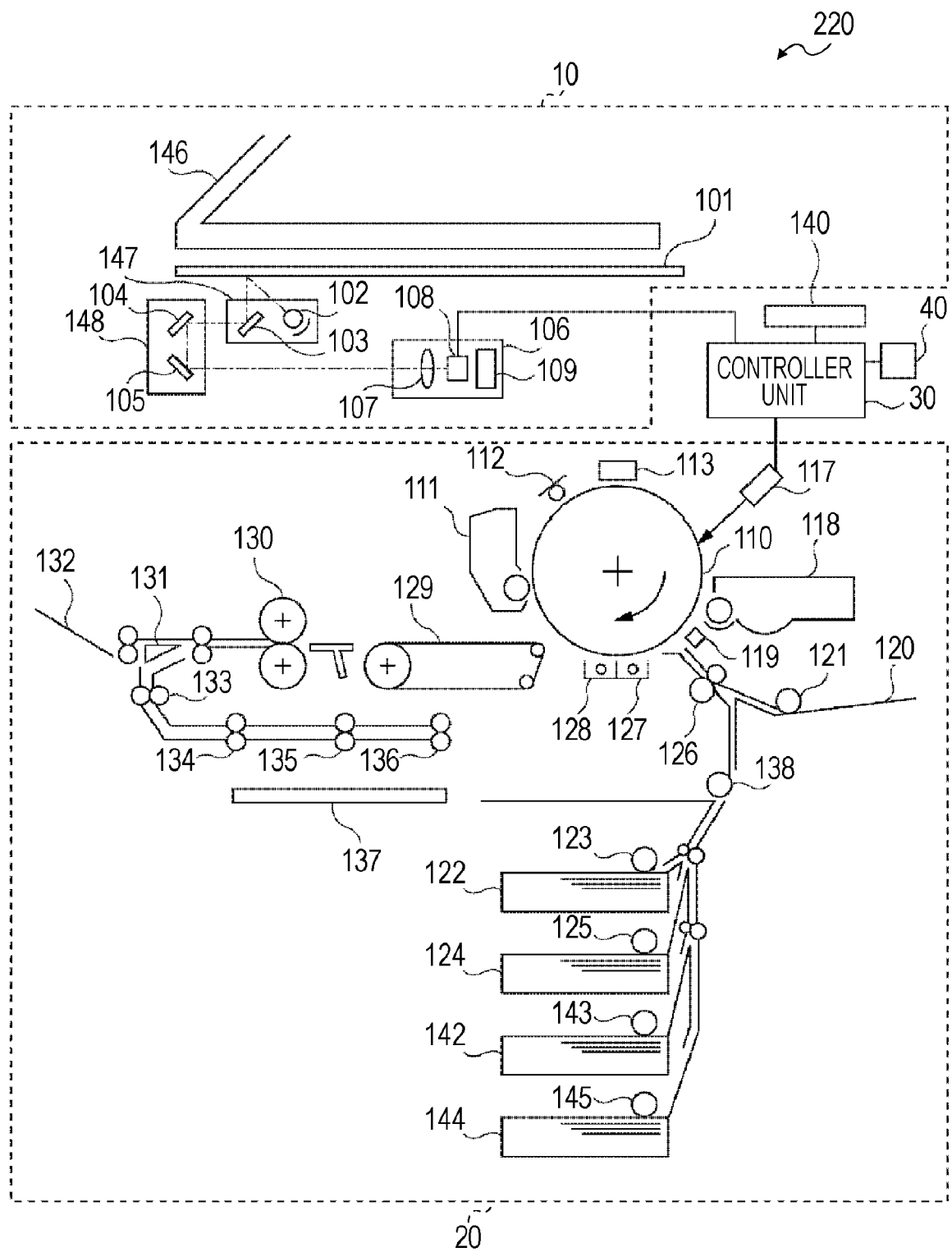
FIG. 2 schematically illustrates a configuration of an image forming apparatus.

FIG. 2 schematically illustrates a configuration of the image forming apparatus 220 shown in FIG. 1.

The image forming apparatus 220 shown in FIG. 2 includes the scanner portion 10, the printer portion 20, the controller unit 30, a power supply unit 40 configured to generate a direct-current (DC) power from an alternating-current (AC) power, and the operating portion 140 being an interface for inputting an operation from a user.

The scanner portion 10 includes a platen glass 101 on which an original is placed and an automatic document feeder 146 for sequentially conveying originals to a predetermined place. The scanner portion 10 exposes and scans an original placed on the platen glass 101 while moving the original in a main-scanning direction. The scanner portion 10 further includes an original illuminating lamp 102, a scanning mirror 103, a scanning unit 147 disposed below the platen glass 101, and scanning mirrors 104 and 105 configured to reflect light that has been reflected from the scanning mirror 103 toward a charge-coupled device (CCD) unit 106. The scanner portion 10 further includes a scanning unit 148 configured to scan an original moving in a sub-scanning direction at one half the speed of the scanning unit 147 and an image-forming lens 107 configured to receive light reflected from the scanning mirror 105. The scanner portion 10 further includes the CCD unit 106 including an image sensor 108 and a CCD driver 109 configured to drive the image sensor 108. The image sensor 108 is composed of CCDs and configured to convert a formed image into, for example, an 8-bit digital image signal.

The controller unit 30 receives an instruction from the operating portion 140, generates image data based on an image signal output from the image sensor 108, and controls the entire apparatus. The details are described below with reference to FIG. 3.

The printer portion 20 includes a photosensitive drum 110 and forms an electrostatic latent image by exposing the photosensitive drum 110 on the basis of image data generated by the controller unit 30. The printer portion 20 further includes an exposing portion 117 composed of, for example, a semiconductor laser and a developer 118 holding black toner and being configured to develop the electrostatic latent image on the photosensitive drum 110 using the toner. The printer portion 20 further includes a pre-transfer charger 119 configured to apply a high voltage to the toner image developed on the photosensitive drum 110 before the toner image is transferred.

The printer portion 20 further includes a manual feeding unit 120 and feeding units 122, 124, 142, and 144 on which sheets are stored. The printer portion 20 further includes feeding rollers 121, 123, 125, 143, and 145 configured to feed sheets stored on the manual feeding unit 120 and the feeding units 122, 124, 142, and 144, respectively. The printer portion 20 further includes a registration roller 126 configured to feed sheets conveyed from the feeding rollers 121, 123, 125, 143, and 145 to the photosensitive drum 110. The feeding rollers 121, 123, 125, 143, and 145 temporarily stop sheets conveyed from the manual feeding unit 120 and the feeding units 122, 124, 142, and 144, respectively, at the position of the registration roller 126 and then restart conveying so as to coincide with the timing of writing the toner image developed on the photosensitive drum 110.

The printer portion 20 further includes a transfer charger 127 configured to transfer the toner image developed on the photosensitive drum 110 to a fed sheet and a detach charger 128 configured to detach, from the photosensitive drum 110, the sheet to which the toner image is transferred from the photosensitive drum 110. The printer portion 20 further includes a conveying belt 129 configured to convey the detached sheet to a fixing device 130, which will be described below, and a cleaner 111 configured to recover toner remaining on the photosensitive drum 110 without being transferred. The printer portion 20 further includes a pre-exposure lamp 112 configured to eliminate static from the photosensitive drum 110 and a primary charger 113 configured to uniformly charge the photosensitive drum 110.

The printer portion 20 further includes the fixing device 130 configured to fix the toner image transferred to the sheet and a sorter 132 configured to receive the sheet on which the toner image is fixed via a flapper 131. The printer portion 20 further includes an intermediate tray 137 configured to receive the sheet on which the toner image is fixed via the flapper 131 and feeding rollers 133 to 136. The printer portion 20 further includes a re-feeding roller 138 configured to re-convey the sheet placed in the intermediate tray 137 to the photosensitive drum 110. The flapper 131 is configured to switch a destination of the sheet on which the toner image is fixed between the sorter 132 and the intermediate tray 137. The feeding rollers 133 to 136 are configured to non-reverse the sheet on which the toner image is fixed (for multiple printing) or reverse it (for duplex printing).

Figure 3:
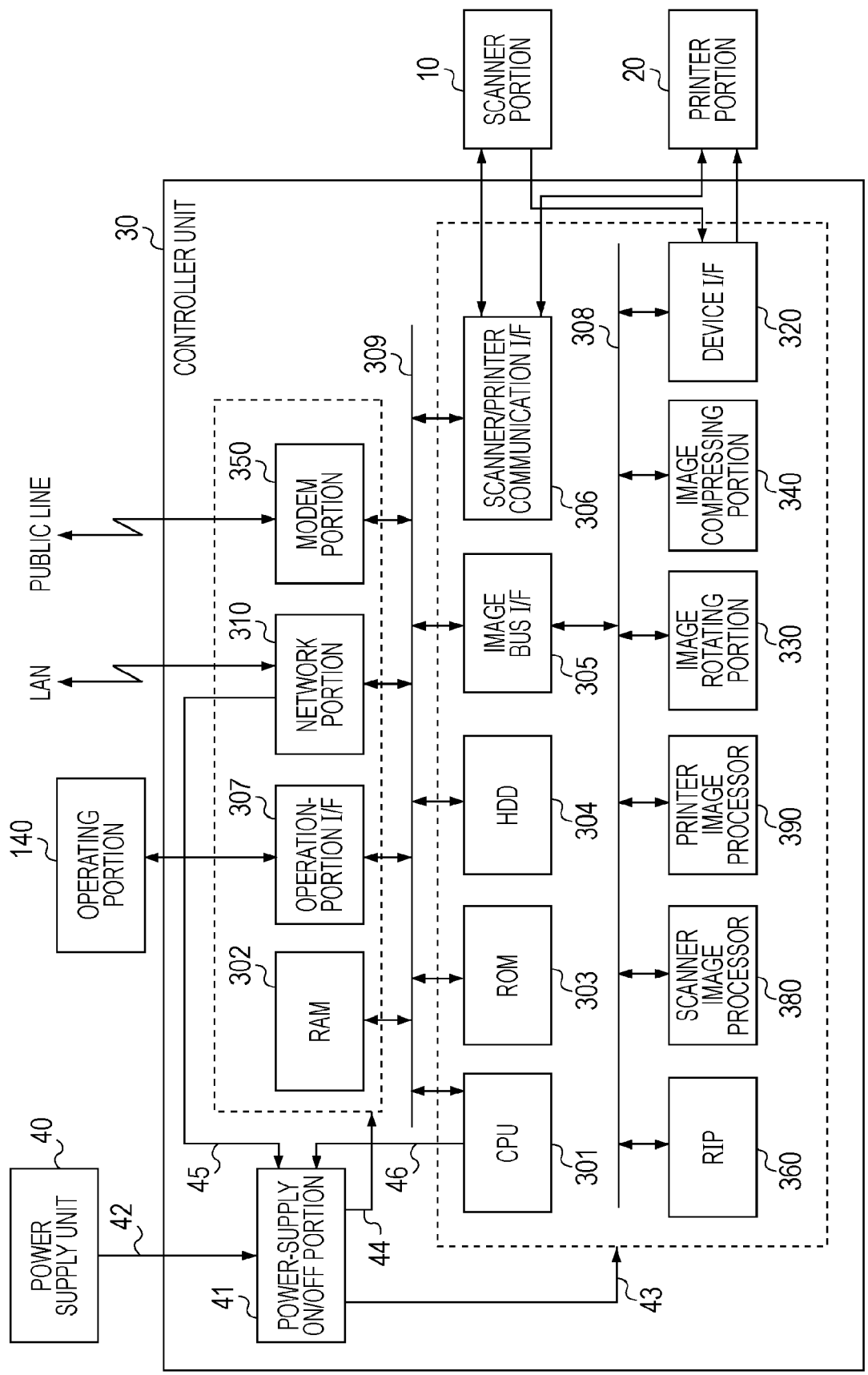
FIG. 3 is a block diagram that illustrates a configuration of a controller unit.

FIG. 3 is a block diagram that illustrates a configuration of the controller unit 30 shown in FIG. 2.

Referring to FIG. 3, the controller unit 30 is connected to the scanner portion 10, the printer portion 20, the LAN 501, and a public line and is used to receive and output image data and device information.

The controller unit 30 includes a raster image processor (RIP) 360 configured to convert a page-description language (PDL) code contained in a print job received from, for example, the PC 212 into a bitmapped image. The controller unit 30 further includes a scanner image processor 380 configured to correct, process, and edit image data input from the scanner portion 10. The controller unit 30 further includes a printer image processor 390 configured to correct image data to be output (printed) by the printer portion 20 and to covert resolution thereof and an image rotating portion 330 configured to rotate image data. The controller unit 30 further includes an image compressing portion 340 configured to compress and decompress multivalued image data with joint photographic experts group (JPEG) and binary image data with joint bi-level image experts group (JBIG), modified modified READ (MMR), or modified Huffman (MH). The controller unit 30 further includes a device I/F 320 configured to connect the scanner portion 10, the printer portion 20, and the controller unit 30 and to convert image data synchronously or asynchronously. The controller unit 30 further includes an image bus 308 configured to connect these components and to allow image data to be transferred thereamong at a high speed.

The controller unit 30 further includes a central processing unit (CPU) 301 being a controller (control unit) controlling the image forming apparatus 220 and a random-access memory (RAM) 302 being a system work memory for use in operating the CPU 301 and also being an image memory for use in temporarily storing image data. The controller unit 30 further includes an operation-portion I/F 307 being an interface to the operating portion 140, being configured to output to the operating portion 140 image data to be displayed on the operating portion 140, and serving to convey information input from a user of the system through the operating portion 140 to the CPU 301. The controller unit 30 further includes a network portion 310 (packet processing unit) connected to the LAN 501 and configured to communicate (perform transmission and reception) with the PCs 212 and 213. The controller unit 30 further includes a modem portion 350 connected to the public line and configured to perform data communication (transmission and reception) with an external facsimile machine. The network portion 310 is configured to receive data from the PCs 212 and 213 and process the received data. The controller unit 30 further includes a read-only memory (ROM) 303 in which a boot program executable by the CPU 301 is stored and a hard disk drive (HDD) 304 configured to store system software, image data, and counter values of software. The controller unit 30 further includes a scanner/printer communication I/F 306 configured to communicate with the CPU of each of the scanner portion 10 and the printer portion 20. The controller unit 30 also includes a system bus 309 configured to connect the components described above.

The controller unit 30 further includes an image bus I/F 305 being a bus bridge connecting the system bus 309 and the image bus 308 and configured to convert a data structure. The controller unit 30 further includes a power-supply ON/OFF portion 41 configured to supply a DC power received from the power supply unit 40 (power supplying unit) through a power supply line 42 to a predetermined circuit element of the controller unit 30 through power supply lines 43 and 44. The power-supply ON/OFF portion 41 is controlled on the basis of a control signal received from the network portion 310 through a control signal line 45 and a control signal received from the CPU 301 through a control signal line 46. The power-supply ON/OFF portion 41 is configured to selectively turn ON and OFF the power supply lines 43 and 44. The power supply line 43 is connected to the CPU 301, the ROM 303, the HDD 304, the image bus I/F 305, and the scanner/printer communication I/F 306. The power supply line 43 is also connected to the device I/F 320, the image rotating portion 330, the image compressing portion 340, the RIP 360, the scanner image processor 380, and the printer image processor 390. The power supply line 44 is connected to the RAM 302, the operation-portion I/F 307, the network portion 310, and the modem portion 350.

The image forming apparatus 220 illustrated in FIG. 1 executes print processing on the basis of a print job transmitted from the PC 212 connected to the LAN 501 in the way described below. The CPU 301 stores print data being image data received from the PC 212 connected to the LAN 501 through the network portion 310 in the RAM 302. The image data is supplied to the RIP 360 through the image bus I/F 305. The RIP 360 converts the image data (PDL code) into bitmapped data. The image compressing portion 340 compresses the bitmapped data, and the compressed data is stored in the HDD 304. Then, the image data stored in the HDD 304 (compressed bitmapped data) is supplied to the image compressing portion 340 through the image bus I/F 305. The image compressing portion 340 decompresses the supplied image data (compressed bitmapped data). The printer image processor 390 corrects the image data for the printer and converts the resolution thereof. The image rotating portion 330 rotates the image data if needed. Subsequently, the image data subjected to the above processing is transmitted as print data to the printer portion 20 through the device I/F 320, and the printer portion 20 prints the image data on a sheet.

The image forming apparatus 220 can operate in the deep sleep mode, which is one of power saving modes. In the normal mode, the power supply unit 40 supplies a power to the power-supply ON/OFF portion 41 through the power supply line 42, and the CPU 301 controls the power-supply ON/OFF portion 41 such that both the power supply lines 43 and 44 are in an ON state. At this time, the power is supplied from the power supply unit 40 to both the CPU 301 and the network portion 310. In the deep sleep mode, the power supply unit 40 supplies a power to the power-supply ON/OFF portion 41 through the power supply line 42, and the CPU 301 controls the power-supply ON/OFF portion 41 such that the power supply line 43 is in an OFF state and the power supply line 44 is in an ON state. At this time, supplying a power to a main circuit element including the CPU 301 of the controller unit 30 is interrupted. Accordingly, power consumption of the image forming apparatus 220 can be significantly reduced. Additionally, when the network portion 310 receives data, such as a print job, from the PC 212 or other apparatus, the network portion 310 can control the power-supply ON/OFF portion 41 so as to cause the image forming apparatus 220 to return to the normal mode. In the foregoing description, in the deep sleep mode, supplying a power to the CPU 301 is interrupted. However, other forms may also be applicable. For example, supplying a power to the CPU 301 in the deep sleep mode can also be made smaller than that in the normal mode. In this case, processing executable by the CPU 301 in the deep sleep mode is more limited than that in the normal mode. The limitation of the executable processing contains at least processing for data received by the network portion 310 from, for example, the PC 212.

In the deep sleep mode, because the RAM 302 receives a power from the power supply unit 40, the RAM 302 performs self-refreshing and backs up a system program.

In the foregoing description, the network portion 310 switches the power-supply mode from the deep sleep mode to the normal mode. However, other forms may also be applicable. Specifically, in place of the network portion 310, the modem portion 350 or the operation-portion I/F 307 may also switch the power supply mode from the deep sleep mode to the normal mode. In the case of the modem portion 350, facsimile communication using a public line can be performed. In the case of the operation-portion I/F 307, an instruction from a user who uses the operation-portion I/F 307 can be received.

The image forming apparatus 220 shown in FIG. 1 returns from the deep sleep mode to the normal mode in the way described below.

When the network portion 310 receives a print job from, for example, the PC 212, the network portion 310 analyzes whether a packet received as the print job contains a data sequence corresponding to a physical address unique to the apparatus to which the network portion 310 belongs. If the network portion 310 detects the data sequence corresponding to the apparatus, the network portion 310 controls the power-supply ON/OFF portion 41 through the control signal line 45 so as to turn on the power supply line 43 and thus activates the CPU 30. At this time, the CPU 301 determines from the power-supply ON/OFF portion 41 whether its activation is caused by returning from the deep sleep mode to the normal mode. If the CPU 301 determines that its activation is caused by returning from the deep sleep mode to the normal mode, the CPU 301 starts a boot sequence. At this time, the CPU 301 omits a sequence to download a system program from the HDD 304 into the RAM 302 and employs a system program backed up in the RAM 302 in moving to the deep sleep mode. The controller unit 30 is thus made to operate in the normal mode, and in response to the print job from the PC 212, the controller unit 30 causes the printer portion 20 to start outputting for printing.

Figure 4:
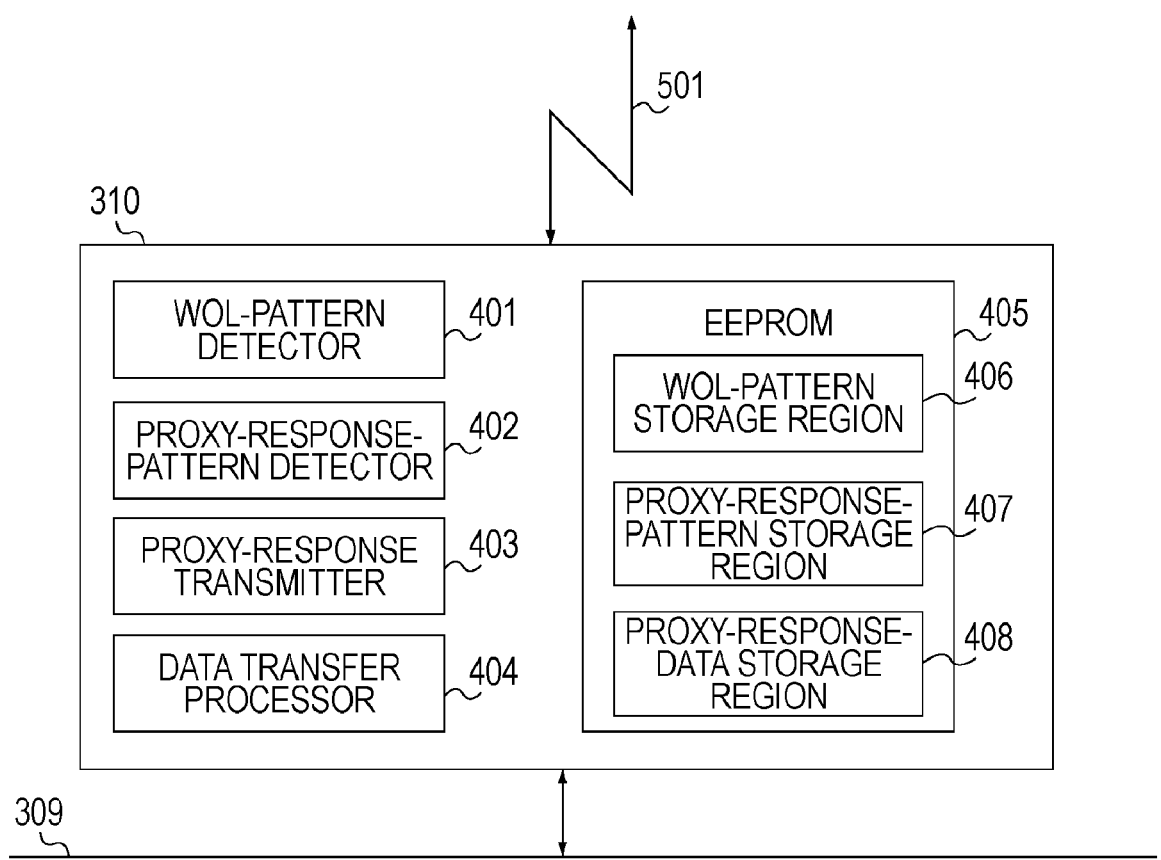
FIG. 4 is a block diagram that illustrates an example of a configuration of a network portion.

FIG. 4 is a block diagram that illustrates one example of a configuration of the network portion 310.

The network portion 310 includes a WOL-pattern detector 401, a proxy-response-pattern detector 402, a proxy-response transmitter 403, a data transfer processor 404, and an electrically erasable programmable ROM (EEPROM) 405 (storage unit). The EEPROM 405 has a plurality of storage regions, i.e., a WOL-pattern storage region 406 (first storage region), a proxy-response-pattern storage region 407 (second storage region), and a proxy-response-data storage region 408 (third storage region). The EEPROM 405 is a non-volatile memory storing a packet recognizable by the network portion 310, and the content thereof is rewritable.

The WOL-pattern detector 401 detects whether, in the deep sleep mode, a packet received over the LAN 501 matches a packet pattern registered in the WOL-pattern storage region 406 of the EEPROM 405. Packet patterns registered in the WOL-pattern storage region 406 are called Wake On LAN (WOL) packets. If the WOL-pattern detector 401 detects a WOL packet, the WOL-pattern detector 401 provides the power supply unit 40 with an instruction to cause the power-supply ON/OFF portion 41 to restart supplying a power to the CPU 301 and other elements through the power supply line 43.

The proxy-response-pattern detector 402 detects whether, in the deep sleep mode, a packet received over the LAN 501 matches a packet pattern registered in the proxy-response-pattern storage region 407 of the EEPROM 405. Packet patterns registered in the proxy-response-pattern storage region 407 are ones used for replying to the received packet using response data stored in the proxy-response-data storage region 408 without restarting of supplying a power to the CPU 301. If the proxy-response-pattern detector 402 detects a proxy response pattern, the proxy-response-pattern detector 402 reads proxy response data associated with the detected proxy response pattern from the proxy-response-data storage region 408. Then, the proxy-response-pattern detector 402 provides the data transfer processor 404 with an instruction to transmit the proxy response data to a source that transmitted the packet over the LAN 501. Even when the proxy-response-pattern detector 402 detects the proxy response pattern, the proxy-response-pattern detector 402 does not provide the power supply unit 40 with an instruction to cause the power-supply ON/OFF portion 41 to restart supplying a power to the CPU 301 and other elements through the power supply line 43. Accordingly, the image forming apparatus 220 can perform reply processing in response to receiving the proxy response pattern while maintaining its power saving mode without returning from the power saving mode to the normal mode.

An operation of the image forming apparatus 220 is described below with reference to FIGS. 5 to 10.

Figure 5:
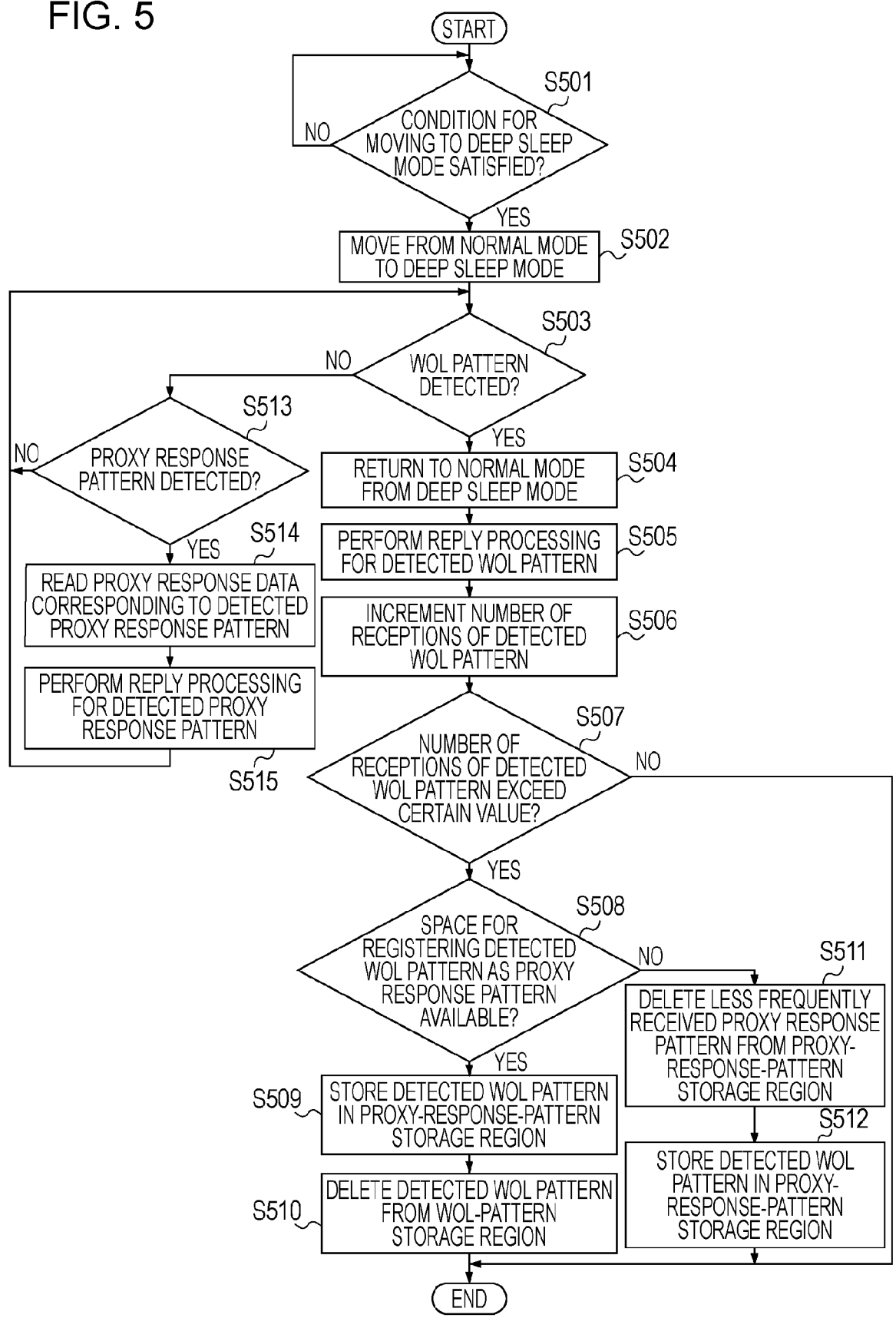
FIG. 5 is a flowchart illustrating a process performed by the image forming apparatus.

FIG. 5 is a flowchart illustrating a process performed by the image forming apparatus 220.

Steps illustrated in FIG. 5 are executed by the CPU 301 reading a program from the HDD 304 or the ROM 303 into the RAM 302, except that steps S503, S504, S513, and S514 are executed by the network portion 310 in the deep sleep mode at which a power is not supplied to the CPU 301. The network portion 310 includes a CPU (not shown), and the components 401 to 404 are executed by software processing performed by the CPU. Alternatively, each of the components 401 to 404 may also be composed of a hardware circuit.

FIGS. 6 and 7 illustrate examples of a packet received by the network portion 310 over the LAN 501 from the PC 212. In FIGS. 6 and 7, Destination Ether Address indicates the physical address of the image forming apparatus 220; Source Ether Address indicates the physical address of the PC 212; Destination IP Address indicates the Internet Protocol (IP) address of the image forming apparatus 220; Source IP Address indicates the IP address of the PC 212. Data Type in each of FIGS. 6 and 7 indicates that the status is requested. Specific status types requested in FIG. 6 are the amount of toner remaining and the amount of paper left in the first cassette (feeding unit 122); those in FIG. 7 are the amount of paper left in the second cassette (feeding unit 123) and that in the third cassette (feeding unit 124). FIG. 8 illustrates examples of packet patterns stored in the WOL-pattern storage region 406 and shows that a packet pattern of a status request for the amount of paper left in the second cassette and a packet pattern of a status request for the amount of paper left in the third cassette are stored. FIG. 9 illustrates examples of packet patterns stored in the proxy-response-pattern storage region 407 and shows that a packet pattern of a status request for the amount of toner remaining and a packet pattern of a status request for the amount of paper left in the first cassette are stored.

The image forming apparatus 220 begins its operation in response to turning on the main switch (not shown) being a power-supply source switch of the image forming apparatus 220. When the main switch SW is turned on, the power supply unit 40 (power supplying unit) starts supplying a power to the controller unit 30. The power-supply ON/OFF portion 41 starts supplying a power to the power supply lines 43 and 44. The controller unit 30 reads the boot program stored in the ROM 303 and starts executing the boot sequence. The system program to be executed by the image forming apparatus 220 is stored in the HDD 304 and is read from the HDD 304 in accordance with the above-described boot sequence. The read program is written in the RAM 302. In response to execution of the system program in the RAM 302 by the CPU 301, a series of operations of the image forming apparatus 220 is started. Steps illustrated in FIG. 5 are started by execution of the system program described above.

In step S501, the CPU 301 determines whether a condition for moving the image forming apparatus 220 to the deep sleep mode is satisfied. For example, when a state in which the network portion 310 receives no packet continues for a preset period of time (e.g., 15 minutes) after the completion of printing processing of the image forming apparatus 220, the CPU 301 determines that the condition for moving to the deep sleep mode is satisfied.

In step S502, the CPU 301 issues the power-supply ON/OFF portion 41 through the control signal line 46 with an instruction to interrupt supplying the power through the power supply line 43. When the power-supply ON/OFF portion 41 receives the instruction from the CPU 301, the power-supply ON/OFF portion 41 turns the power supply line 43 off and moves the image forming apparatus 220 to the deep sleep mode, at which the power is not supplied to a part of the controller unit 30. At this time, the CPU 301 notifies the PC 212 through the network portion 310 of switching to the deep sleep mode. This is because the image forming apparatus 220 may be unable to reply to a packet received from the PC 212 due to not supplying the power to the CPU 301 during the deep sleep mode. The CPU 301 stores data corresponding to a packet pattern stored in the proxy-response-pattern storage region 407 in the proxy-response-data storage region 408 when being moved to the deep sleep mode. Because the amount of paper left in the first cassette is registered as a packet pattern in FIG. 9, information indicating the presence/absence of paper detected as the amount of paper left in the feeding unit 122 by a sensor (not shown) provided on the feeding unit 122 is stored in the proxy-response-data storage region 408. Because the amount of toner remaining is registered as a packet pattern in FIG. 9, information indicating the amount of toner remaining detected as the remaining amount of toner accommodated in the developer 118 by a sensor (not shown) provided on the developer 118 is stored in the proxy-response-data storage region 408.

In step S503, the WOL-pattern detector 401 of the network portion 310 detects whether a packet received from the PC 212 or PC 213 over the LAN 501 matches a WOL pattern stored in the WOL-pattern storage region 406. Because the patterns shown in FIG. 8 are stored in the WOL-pattern storage region 406 of the network portion 310, when the packet for the status request shown in FIG. 6 is received from the PC 212, the network portion 310 determines NO (in step S503), and flow proceeds to step S513. When the packet for the status request shown in FIG. 7 is received from the PC 212, the network portion 310 determines YES (in step S503), and flow proceeds to step S504.

In step S504, in response to the detection of the WOL pattern, the network portion 310 provides the power-supply ON/OFF portion 41 through the control signal line 45 with an instruction to restart supplying a power through the power supply line 43. When the power-supply ON/OFF portion 41 receives the instruction, the power-supply ON/OFF portion 41 turns the power supply line 43 on and returns the image forming apparatus 220 from the deep sleep mode, at which the power is not supplied to a part of the controller unit 30, to the normal mode.

In step S505 (first executing step), the CPU 301 performs reply processing for the WOL pattern detected in step S503. In the example illustrated in FIG. 8, the status request for the amount of paper left in the second cassette and that in the third cassette is made. Thus, a response packet illustrated in FIG. 10 is generated on the basis of information indicating the presence/absence of paper detected as the amount of paper left in each of the feeding units 123 and 124 by a sensor (not shown) provided on each of these feeding units. The CPU 301 instructs the network portion 310 to transmit the response packet illustrated in FIG. 10 to the PC 212.

In step S506, the CPU 301 adds one to the number of receptions of the WOL pattern detected in step S503 (increments the number of receptions by one). The number of receptions of the WOL pattern has been stored in the HDD 304.

In step S507, the CPU 301 determines whether the number of receptions of the WOL pattern incremented in step S506 exceeds a certain value (e.g., 20). If it is exceeded (YES in step S507), flow proceeds to step S508; otherwise (NO in step S507), the processing is completed and returns to step S501.

In step S508, the CPU 301 determines whether a space where the WOL pattern determined to be received more than a predetermined number of times in step S507 can be stored as a proxy response pattern is present in the proxy-response-pattern storage region 407. If the CPU 301 determines that such an available space is present (YES in step S508), flow proceeds to step S509. If the CPU 301 determines that there is no such an available space (NO in step S508), flow proceeds to step S511.

In step S509, the CPU 301 stores the WOL pattern detected in step S503 in the proxy-response-pattern storage region 407. In step S510, the CPU 301 deletes the WOL pattern detected in step S503 from the WOL-pattern storage region 406.

In step S511, the CPU 301 deletes, from the proxy-response-pattern storage region 407, a less frequently received proxy response pattern. For example, a case is discussed where, when the proxy response patterns illustrated in FIG. 9 are stored in the proxy-response-pattern storage region 407, the number of receptions of the status request for the amount of toner remaining is 15 and that of the status request for the amount of paper left in the first cassette is 5. In this case, because the number of receptions of the status request for the amount of paper left in the first cassette is small, the packet pattern relating to the amount of paper left in the first cassette is deleted from the proxy-response-pattern storage region 407. In the foregoing description, a less frequently received packet pattern is deleted from the proxy-response-pattern storage region 407. However, other forms may also be applied. For example, among a plurality of packet patterns stored in the proxy-response-pattern storage region 407, a least recently stored packet pattern may be deleted. Alternatively, for example, a packet pattern that has been received a smallest number of times in a certain period (e.g., past one week) may be deleted.

In step S512, the CPU 301 stores the WOL pattern detected in step S503 in the proxy-response-pattern storage region 407.

Through steps S509 to S512, a WOL pattern that is received more than a predetermined number of times can be stored as a proxy response pattern. This is useful for when the status request from the PC 212 (e.g., request for the amount of paper left in the second cassette (feeding unit 123)) is frequently received. Specifically, the image forming apparatus enables the network portion 310 to perform reply processing while maintaining the deep sleep mode without returning from the deep sleep mode to the normal mode.

The processing occurring when the WOL pattern is not detected in step S503 is described next.

In step S513, the proxy-response-pattern detector 402 of the network portion 310 detects whether the packet received from the PC 212 or 213 over the LAN 501 matches a packet pattern stored in the proxy-response-pattern storage region 407. Because the packet patterns shown in FIG. 9 are stored in the proxy-response-pattern storage region 407 of the network portion 310, when the packet for the status request shown in FIG. 6 is received from the PC 212, the network portion 310 determines YES (in step S513), and flow proceeds to step S514. When the packet for the status request shown in FIG. 7 is received from the PC 212, the network portion 310 determines NO (in step S513), and flow proceeds to step S503.

In step S514, the network portion 310 reads proxy response data (shown in FIG. 11) corresponding to the proxy response pattern detected in step S513 from the proxy-response-data storage region 408. Because the packet patterns shown in FIG. 9 relate to the amount of toner remaining and the amount of paper left in the first cassette, "low toner level" is read as the amount of toner remaining and "paper is present in first cassette" is read as the amount of paper left in the first cassette.

In step S515 (second executing step), the network portion 310 performs reply processing for the proxy response pattern detected in step S513. In the example illustrated in FIG. 6, the status request for the amount of toner remaining and the amount of paper left in the first cassette is made. Thus, a response packet illustrated in FIG. 12 is generated on the basis of information indicating the presence/absence of paper detected as the amount of toner remaining and the amount of paper left in the feeding unit 122 stored in the proxy-response-data storage region 408. The network portion 310 transmits the response packet illustrated in FIG. 12 to the PC 212, and flow proceeds to step S503. In the reply processing of step S515, the deep sleep mode can be maintained. Accordingly, the reply processing can be promptly performed, while at the same time there is no power consumption caused by a power supplied to the CPU 301.

As described above, according to the first embodiment, a WOL pattern that is received more than a predetermined number of times can be stored as a proxy response pattern. Thus, the image forming apparatus enables the network portion 310 to perform reply processing while maintaining the deep sleep mode without returning from the deep sleep mode to the normal mode.

A second embodiment of the present invention is described next.

The second embodiment is a modified example of the first embodiment and is substantially the same as the first embodiment except the respect described below.

In the first embodiment, steps S505 to S512 illustrated in FIG. 5 are executed by the CPU 301. In contrast, in the second embodiment, steps S505 to S512 illustrated in FIG. 5 are executed by the network portion 310, thus reducing the load of processing in the CPU 301.

Figures 13, 14:
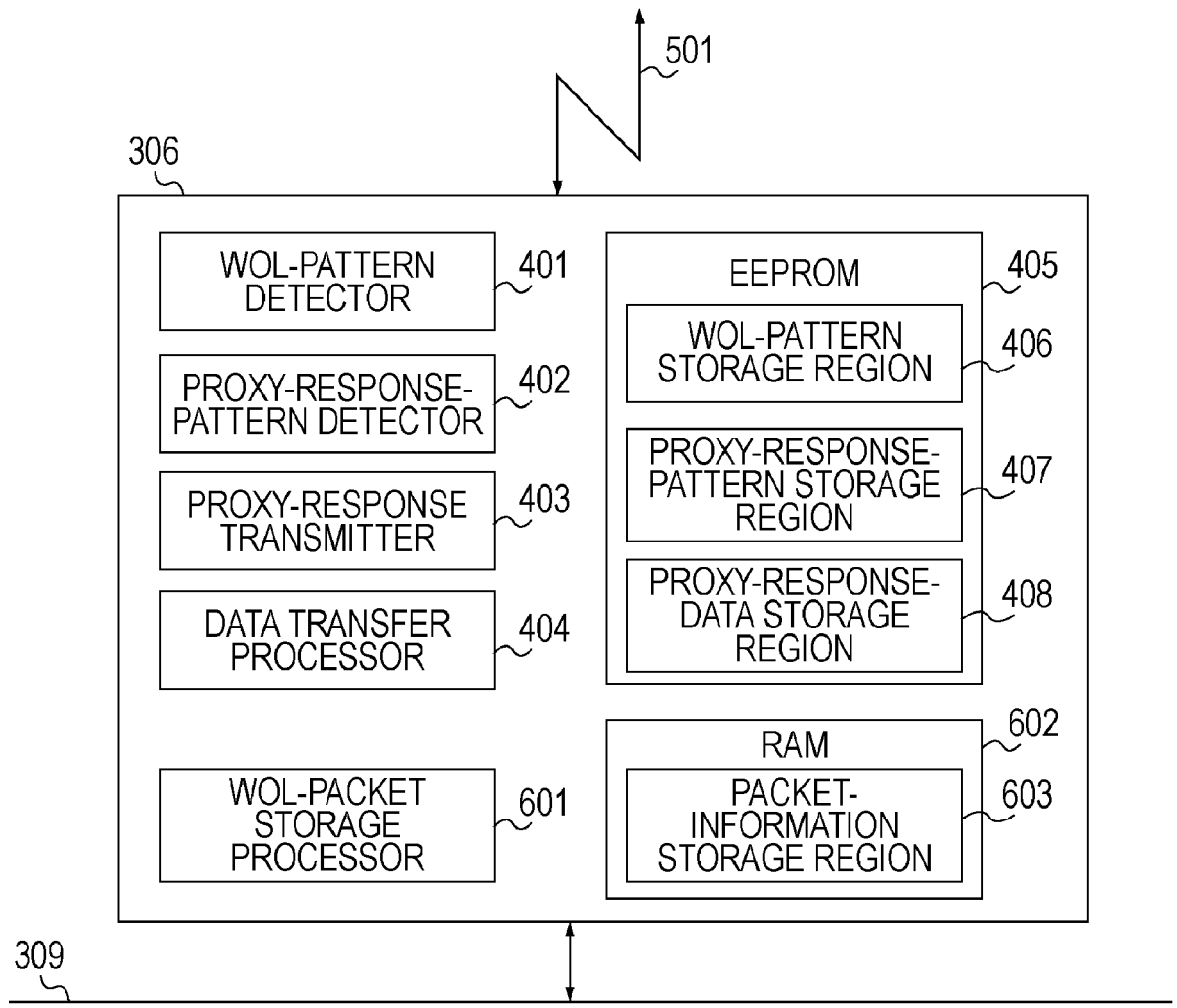
FIG. 13 is a block diagram that illustrates another example of the configuration of the network portion.
FIG. 14 illustrates one example of information that is referred to in order to switch a WOL pattern to a proxy response pattern.

FIG. 13 is a block diagram that illustrates another example of a configuration of the network portion 310 according to the second embodiment.

FIG. 13 differs from FIG. 4 in that a WOL-packet storage processor 601 and a RAM 602 are added to the network portion 310. The RAM 602 includes a packet-information storage region 603 as a storage region.

The processing performed by the image forming apparatus 220 in the second embodiment is substantially the same as steps illustrated in FIG. 5 described in the first embodiment, but differs in the following respect.

In the first embodiment, one is added to the number of receptions (increment) in step S506, and information thereof is stored in the HDD 304. In contrast, in the second embodiment, the WOL-packet storage processor 601 stores the information thereof in the packet-information storage region 603.

As described above, according to the second embodiment, in addition to the advantageous effects of the first embodiment, the load of processing in the main controller (CPU 301) of the image forming apparatus can be reduced.

A third embodiment of the present invention is described next.

The third embodiment is a modified example of the first embodiment and is substantially the same as the first embodiment except the respect described below.

In the first embodiment, in step S507 illustrated in FIG. 5, for the determination of whether the number of receptions of a WOL pattern exceeds a predetermined value, "predetermined value" is not changed for any type of the WOL pattern (e.g., 20 receptions). In contrast, in the third embodiment, "predetermined value" used in the determination in step S507 varies depending on the type of the WOL pattern.

Specifically, information illustrated in FIG. 14 is stored in the HDD 304 in advance. The CPU 301 refers to the information illustrated in FIG. 14 in the determination in step S507 whether the number of receptions of the WOL pattern detected in step S503 exceeds a predetermined value. The information illustrated in FIG. 14 can be referred to by the CPU 301.

For example, when the WOL pattern detected in step S503 is "the status request/the amount of paper left in the second cassette" illustrated in FIG. 8, the CPU 301 refers to the information illustrated in FIG. 14 to perform the determination in step S507. If the number of receptions of the WOL pattern for "the status request/the amount of paper left in the second cassette" exceeds 20 (YES in step S507), the CPU 301 advances the processing to step S509; otherwise (NO in step S507) the CPU 301 advances the processing to step S511.

In another case, for example, when the WOL pattern detected in step S503 is "the status request/the amount of paper left in the third cassette" illustrated in FIG. 8, the CPU 301 refers to the information illustrated in FIG. 14 to perform the determination in step S507. If the number of receptions of the WOL pattern for "the status request/the amount of paper left in the third cassette" exceeds 30 (YES in step S507), the CPU 301 advances the processing to step S509; otherwise (NO in step S507) the CPU 301 advances the processing to step S511.

The information indicating the number of receptions illustrated in FIG. 14 can be freely set by a user of the image forming apparatus 220 through the operating portion 140 illustrated in FIG. 1.

As described above, according to the third embodiment, in addition to the advantageous effects of the first embodiment, the number of receptions used to store a new WOL pattern as a proxy response pattern can be changed depending on the type of the WOL pattern. Thus, the image forming apparatus can perform proxy response processing for a packet pattern in accordance with a network environment where the image forming apparatus is placed.

A fourth embodiment of the present invention is described next.

The fourth embodiment is a modified example of the first embodiment and is substantially the same as the first embodiment except the respect described below.

In the fourth embodiment, a proxy response pattern stored in the proxy-response-pattern storage region 407 of the network portion 310 of the image forming apparatus 220 is transmitted to another image forming apparatus. When an image forming apparatus is newly placed in the LAN 501, proper proxy reply processing suited for the network can be performed by storing a proxy response pattern stored in a previously placed image forming apparatus in the LAN 501 in the newly placed image forming apparatus.

Figure 15:
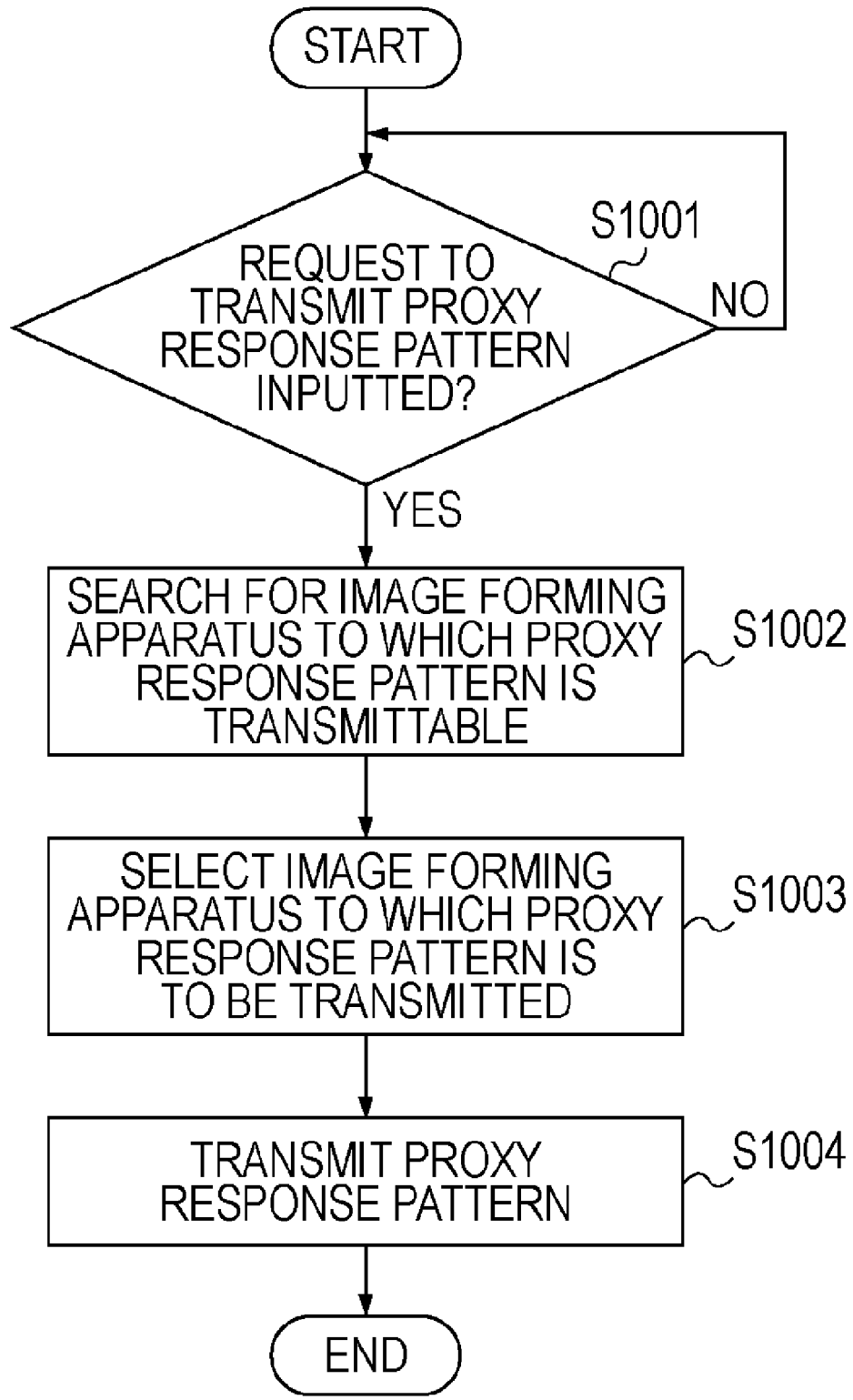
FIG. 15 is a flowchart illustrating a process performed by the image forming apparatus.

FIG. 15 is a flowchart illustrating a process performed by the image forming apparatus 220.

The CPU 301 of the image forming apparatus 220 reads a program from the HDD 304 or the ROM 303 to the RAM 302 and executes the processing of steps in FIG. 15.

Figure 16:
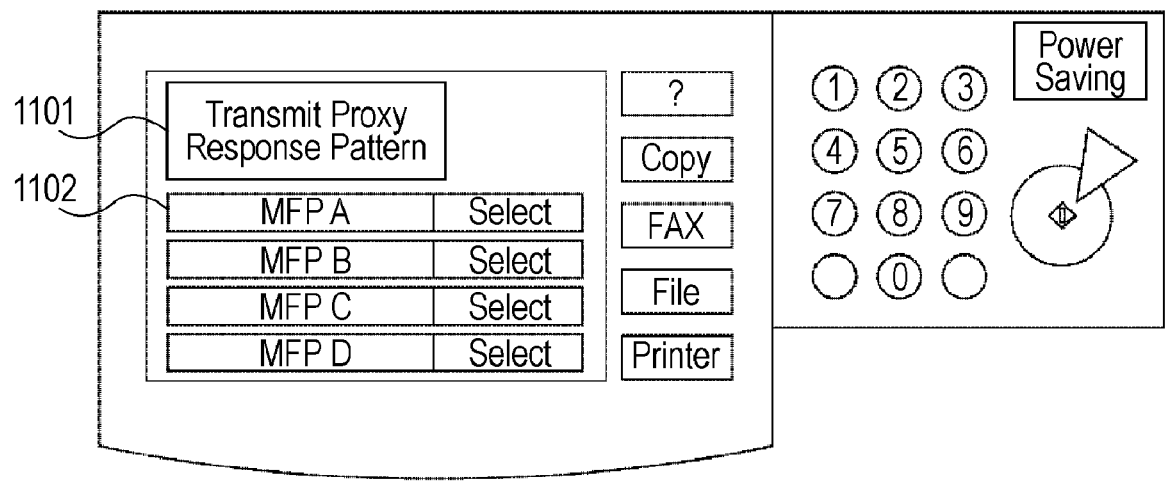
FIG. 16 illustrates one example of an operating screen of an operating portion of the image forming apparatus.

In step S1001, the CPU 301 determines whether a user of the image forming apparatus 220 has input a request to transmit a proxy response pattern to another image forming apparatus through the operating portion 140. If it is determined that the request has been input (YES in step S1001), flow proceeds to step S1002. The user of the image forming apparatus 220 can input the request by pressing a button 1101 illustrated in FIG. 16, for example.

In step S1002, the CPU 301 transmits a search packet to the LAN 501 to search for another image forming apparatus (multifunction peripheral (MFP)) connected to the image forming apparatus 220 over the LAN 501. When the image forming apparatus 220 receives a response to the search packet, information on other image forming apparatuses (MFPs) connected to the image forming apparatus 220 over the LAN 501 is displayed on the operating portion 140, as illustrated in an area 1102 in FIG. 16.

In step S1003, the CPU 301 selects one of the image forming apparatuses listed on the operating portion 140, as illustrated in the area 1102, in response to an instruction from the user.

In step S1004, the CPU 301 transmits the proxy response pattern stored in the proxy-response-pattern storage region 407 to the selected image forming apparatus.

Figure 17:
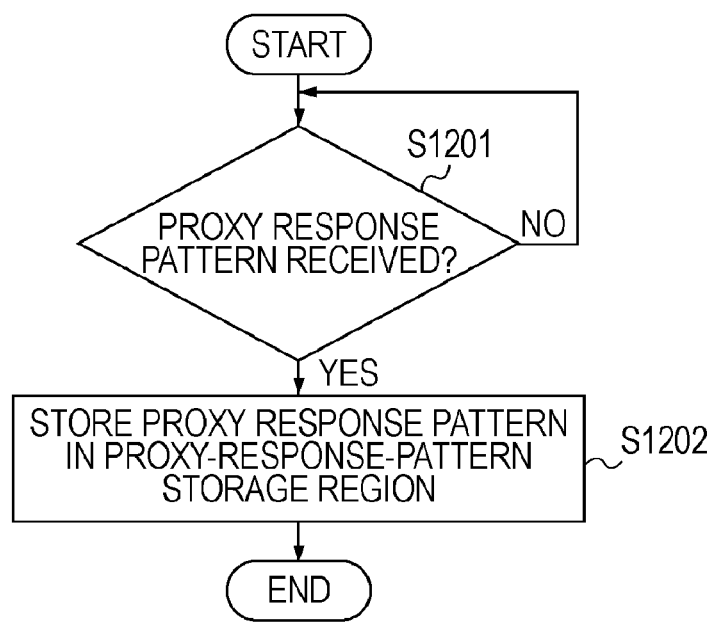
FIG. 17 is a flowchart illustrating a process performed by another image forming apparatus.

The processing for receiving a proxy response pattern in the image forming apparatus selected in step S1003 illustrated in FIG. 15 is described next with reference to the flowchart illustrated in FIG. 17.

In the description below, a case is discussed where the user of the image forming apparatus 220 selects the image forming apparatus 230 illustrated in FIG. 1 as a destination of transmission of the proxy response pattern. The CPU 301 of the image forming apparatus 230 reads a program from the HDD 304 or the ROM 303 to the RAM 302 and executes the processing of steps in FIG. 17.

In step S1201, the CPU 301 of the image forming apparatus 230 determines whether the network portion 310 has received the proxy response pattern transmitted from the image forming apparatus 220. If the CPU 301 determines the reception of the proxy response pattern (YES in step S1201), flow proceeds to step S1202.

In step S1202, the CPU 301 stores the proxy response pattern received from the image forming apparatus 220 in the proxy-response-pattern storage region 407 of the network portion 310.

As described above, according to the fourth embodiment, in addition to the advantageous effects of the first embodiment, when an image forming apparatus is newly placed in a network, a proxy response pattern stored in an image forming apparatus previously placed in the network is stored in the newly placed image forming apparatus. Accordingly, the newly placed image forming apparatus can perform proper proxy response processing.

In the above embodiments, a WOL pattern that is received more than a predetermined number of times is registered as a proxy response pattern. However, other forms can also be applied. For example, the mean value of time intervals of receptions of a WOL pattern may be calculated, and the WOL pattern may be registered as the proxy response pattern if the mean value is smaller than a predetermined period of time. Alternatively, the determination of whether a WOL pattern is to be registered as a proxy response pattern may be made on the basis of the number of receptions of the WOL pattern in the past certain period (e.g., past one day or past one week). Further, the determination of whether a WOL pattern is to be registered as a proxy response pattern may be made on the basis of another reception status, other than the number of receptions or the time intervals of receptions.

In the above embodiments, a storage area of the EEPROM is divided into a plurality of storage regions. Various methods can be used in dividing into such storage regions. For example, an address space range may be divided, and resultant regions may be assigned a WOL-pattern storage region, a proxy-response-pattern storage region, and a proxy-response-data storage region. In this case, in re-registering a WOL pattern as a proxy response pattern, the WOL pattern is deleted from the WOL-pattern storage region, and the new WOL pattern is stored in the proxy-response-pattern storage region. Alternatively, a table referred to for determining whether each pattern has been registered as a WOL pattern or a proxy response pattern without a change in physical positions where the patterns are stored may be provided. In this case, in re-registering a packet pattern as a proxy response pattern from a WOL pattern, the table is altered such that a position to be referred to for the packet pattern is changed from the WOL pattern to the proxy response pattern. That is, it is not necessarily required that the storage regions in the above embodiments be physically divided regions; they may be logical regions in which a WOL pattern and a proxy response pattern are congregated.

In the above embodiments, the WOL-pattern storage region 406 and the proxy-response-pattern storage region 407 are EEPROMs being non-volatile storage units. However, they may also be volatile storage units. However, in the case where a volatile storage unit is used, when the main switch of the image forming apparatus 220 is turned off, packet patterns stored in the volatile storage unit is lost. To address this, in the case where the volatile storage unit is used, it is necessary to move the packet pattern from the volatile storage unit to the HDD 304 when it is determined that the main switch of the image forming apparatus 220 will be turned off. Additionally, it is also necessary to move the packet pattern stored in the HDD 304 to the volatile storage unit when the main switch of the image forming apparatus 220 is turned on.

The functions of the present invention can also be achieved by supplying a storage medium in which program code of software performing the functions of at least one of the above embodiments is recorded to a system or an apparatus. In this case, the functions of at least one of the above embodiments are achieved by the system or the apparatus reading and executing the program code stored in the storage medium. In this case, the program code itself read from the storage medium achieves the functions of at least one of the above embodiments, and the storage medium storing the program code is included in the present invention.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2007-328732 filed Dec. 20, 2007, which is hereby incorporated by reference herein in its entirety.

What is claimed is:

1. A data processing apparatus capable of communicating with a computer terminal over a network, the data processing apparatus comprising:
    a packet processing unit configured to receive a packet transmitted from the computer terminal and perform reply processing to the packet;
    a control unit configured to control the data processing apparatus;
    a power supplying unit configured to supply power in either one of a normal mode in which the power supplying unit supplies power to both the control unit and the packet processing unit and a power-saving mode in which the power supplying unit supplies power to the packet processing unit while supplying less power than the power supplied in the normal mode to the control unit; and
    a storage unit configured to store a packet pattern to which the packet processing unit accesses in the power-saving mode,
    wherein the packet processing unit is configured to, when a packet received by the packet processing unit in the power-saving mode matches a type of a first packet pattern stored in the storage unit, perform reply processing suited for the matched packet after returning a power supply mode in which the power supplying unit operates from the power-saving mode to the normal mode and to, when a type of the packet received by the packet processing unit in the power-saving mode matches a type of a second packet pattern stored in the storage unit, perform reply processing suited for the matched packet while maintaining the power supply mode in which the power supplying unit operates at the power-saving mode, and
    the storage unit is configured to change a type of a specific packet pattern stored in the storage unit from the type of the first packet to the type of the second packet pattern, in response to a specific status of a reception state in which the specific packet is received by the packet processing unit.

2. The data processing apparatus according to claim 1, wherein the specific status is a status in which a number of receptions of the specific packet received by the packet processing unit reaches a predetermined value.

3. The data processing apparatus according to claim 2, wherein the storage unit is configured to store the first packet to a first storage region and to store the second packet to a second storage region, and
    wherein the storage unit is configured to, when the number of receptions of the specific packet received by the packet processing unit reaches the predetermined value, if there is no available space for storing the specific packet in the second storage region, delete a packet that is less frequently received by the packet processing unit among a plurality of packets stored in the second storage region and to store the specific packet in the second storage region.

4. The data processing apparatus according to claim 2, wherein the predetermined value varies depending on a type of the specific packet.

5. The data processing apparatus according to claim 1, wherein the storage unit is configured to store response data for use in reply processing performed by the packet processing unit when a type of the packet received by the packet processing unit in the power-saving mode matches a type of the second packet pattern stored in the storage unit, and
    the packet processing unit is configured to, when the packet received by the packet processing unit in the power-saving mode matches a type of the second packet pattern stored in the storage unit, perform reply processing suited for the received packet using the response data.

6. The data processing apparatus according to claim 1, further comprising:
    a selecting unit configured to select a different data processing apparatus connected to the data processing apparatus over the network,
    wherein the packet processing unit is configured to transmit the second packet pattern stored in the storage unit to the different data processing apparatus selected by the selecting unit.

7. The data processing apparatus according to claim 1, wherein the power supplying unit is configured to interrupt the power supplied to the control unit in the power-saving mode.

8. A method for controlling a data processing apparatus communicating with a computer terminal over a network, comprising:
    receiving, by a packet processing unit, a packet transmitted from the computer terminal and performing reply processing to the packet;
    controlling, by a control unit, the data processing apparatus;
    supplying, by a power supplying unit, power in either one of a normal mode in which power is supplied to both the control unit and the packet processing unit and a power-saving mode in which power is supplied to the packet processing unit while supplying less power than the power supplied in the normal mode to the control unit; and storing, by a storage unit, a packet pattern to which the packet processing unit accesses in the power-saving mode, wherein the packet processing unit is configured to, when a packet received by the packet processing unit in the power-saving mode matches a type of a first packet pattern stored in the storage unit, perform reply processing suited for the matched packet after returning a power supply mode in which the power supplying unit operates from the power-saving mode to the normal mode and to, when a type of the packet received by the packet processing unit in the power-saving mode matches a type of a second packet pattern stored in the storage unit, perform reply processing suited for the matched packet while maintaining the power supply mode in which the power supplying unit operates at the power- saving mode, and the storage unit is configured to change a type of a specific packet pattern stored in the storage unit from the type of the first packet pattern to the type of the second packet pattern, in response to a specific status of a reception state in which the specific packet is received by the packet processing unit.

9. A non-transitory computer-readable storage medium storing a computer-executable process, the computer-executable process causing a computer to execute a method for controlling a data processing apparatus communicating with a computer terminal over a network, comprising:

receiving, by a packet processing unit, a packet transmitted from the computer terminal and performing reply processing to the packet;

controlling, by a control unit, the data processing apparatus;

supplying, by a power supplying unit, power in either one of a normal mode in which power is supplied to both the control unit and the packet processing unit and a power-saving mode in which power is supplied to the packet processing unit while supplying less power than the power supplied in the normal mode to the control unit; and storing, by a storage unit, a packet pattern to which the packet processing unit accesses in the power-saving mode, wherein the packet processing unit is configured to, when a packet received by the packet processing unit in the power-saving mode matches a type of a first packet pattern stored in the storage unit, perform reply processing suited for the matched packet after returning a power supply mode in which the power supplying unit operates from the power-saving mode to the normal mode and to, when a type of the packet received by the packet processing unit in the power- saving mode matches a type of a second packet pattern stored in the storage unit, perform reply processing suited for the matched packet while maintaining the power supply mode in which the power supplying unit operates at the power- saving mode, and the storage unit is configured to change a type of a specific packet pattern stored in the storage unit from the type of the first packet pattern to the type of the second packet pattern, in response to a specific status of a reception state in which the specific packet is received by the packet processing unit.

* * * * *